(12) United States Patent
Yang

(10) Patent No.: US 7,258,322 B1
(45) Date of Patent: Aug. 21, 2007

(54) MANUALLY OPERATED SWITCH FOR A FAUCET

(75) Inventor: Chin-Chen Yang, Taichung Hsien (TW)

(73) Assignee: OPS Plumbing Products Inc., Taichung Hsien (TW)

( * ) Notice: Subject to any disclaimer, the term of this patent is extended or adjusted under 35 U.S.C. 154(b) by 0 days.

(21) Appl. No.: 11/406,605

(22) Filed: Apr. 19, 2006

(51) Int. Cl.
*F16K 31/44* (2006.01)

(52) U.S. Cl. .................. 251/323; 251/339; 137/801; 4/678

(58) Field of Classification Search .............. 251/339, 251/323, 321; 137/801, 467; 4/678
See application file for complete search history.

(56) References Cited

U.S. PATENT DOCUMENTS

| | | | | |
|---|---|---|---|---|
| 1,666,531 A | * | 4/1928 | Glauber | ............... 251/339 |
| 3,419,914 A | * | 1/1969 | Moen | ............... 4/678 |
| 3,746,031 A | * | 7/1973 | Christiansen | ............... 4/678 |
| 3,906,983 A | * | 9/1975 | Parkison | ............... 137/467 |
| 6,925,662 B1 | * | 8/2005 | Tan et al. | ............... 137/801 |

* cited by examiner

*Primary Examiner*—John Bastianelli
(74) *Attorney, Agent, or Firm*—William E. Pelton, Esq.; Cooper & Dunham LLP

(57) ABSTRACT

A manually operated switch for a faucet has a body, an inner pipe, a switching valve assembly. The body is hollow. The inner pipe is located inside of the body and has a flowing way. The flowing way is formed through the inner pipe. The switching valve assembly is slidably mounted inside of the flowing way of the inner pipe and extends out the body. When the switching valve assembly closes the flowing way of the inner pipe, the water pressure will keep the switching valve assembly closed. After the water pressure applied to the switching valve assembly is released or dismissed, the switching valve assembly returns back to an original position so that the flowing way is opened. The opening and closing flowing way can manually control the way of water flowing so that a user may not be scared or burned by the water.

6 Claims, 5 Drawing Sheets

MANUALLY OPERATED SWITCH FOR A FAUCET

BACKGROUND OF THE INVENTION

1. Field of the Invention

The present invention relates to a faucet, and more particularly to a manually operated switch for a faucet that is able to prevent an user being scared or burned by the water unintentionally sprayed from a shower head.

2. Description of Related Art

With reference to FIG. 5, a conventional faucet for a water pipe in accordance with the prior art comprises a body (90), a baffle (92) and a shower-driver knob (93).

The body (90) is attached to the water pipe and has a top, a bottom, a handle, a water channel (91), an upper hole, a lower hole and a shower head. The handle is pivotally mounted on the top of the body (90) to allow water to enter into the body (90) from the water pipe. The water channel (91) is formed inside of the body (90) and allows the water from the water pipe to pass through the body (90). The top hole is formed in the top of the body (90) and communicates with the water channel (91). The lower hole is formed in the bottom of the body (90), communicates with the water channel (91) and corresponds to the top hole. The shower head is connected to the lower hole of the body (90).

The baffle (92) is mounted at the water channel (91) to divide the water channel (91) into an upper channel and a lower channel and has a hole. The hole is formed in the baffle (92) and corresponds to the upper hole and lower hole of the body (90).

The shower-driver knob (93) is slidably mounted between the upper hole of the body (90), the hole of the baffle (92) and the lower hole of the body (90) and near the handle of the body (90) and has a bottom and a stopping valve (94). The stopping valve (94) is mounted at the bottom of the shower-driver knob (93) and selectively closes the lower hole of the body (90) or the hole of the baffle (92).

When the shower-driver knob (93) is pulled upward, the stopping valve (94) closes the hole in the baffle (92). The water from the water pipe enters into lower channel of body and is sprayed from the shower head.

When the shower-driver knob (93) is pushed downward, the stopping valve (94) closes the lower hole of the body (90). The water from the water pipe will enter into upper channel of body and is exhausted from the body (90).

A common requirement of the shower-driver knob (93) requires the shower-driver knob (93) to close the lower hole of the body (90) within 90 seconds after the lower hole of the body (90) is opened. However, if a user turns off the faucet for a while and then turns on the faucet again, the water may be sprayed form the shower head within 90 seconds. The spraying water may wet or scare the user. Furthermore, if the spraying water is at a high temperature, the hot water may burn the user so that the shower-driver knob (93) is not safe in use.

During transiting of pulling upward and pushing downward the shower-driver knob (93), the water is continuously exhausted from the body (90) to cause waste of water.

The shower-driver knob (93) and the handle of the body (90) are closed to each other. The user may accidentally switch the shower-driver knob (93) or the handle of the body (90) so that the water may unintentionally be exhausted from the body (90) or the shower head of the body (90) or be turned off.

To overcome the shortcomings, the present invention provides a manually operated switch for a faucet to obviate or mitigate the aforementioned problems.

SUMMARY OF THE INVENTION

The primary objective of the present invention is to provide a manually operated switch for a faucet to prevent an user being scare or burn from the water coming from a shower head.

The manually operated switch for a faucet has a body, an inner pipe, a switching valve assembly. The body is hollow. The inner pipe is located inside of the body and has a flowing way. The flowing way is formed through the inner pipe. The switching valve assembly is slidably mounted inside of the flowing way of the inner pipe and extends out the body. When the switching valve assembly closes the flowing way of the inner pipe, the water pressure will keep the switching valve assembly closed so that the water only can be sprayed from a shower head. After the water pressure applied to the switching valve assembly is released or dismissed, the switching valve assembly returns back to an original position so that the flowing way is opened and the water can be exhausted from the body.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
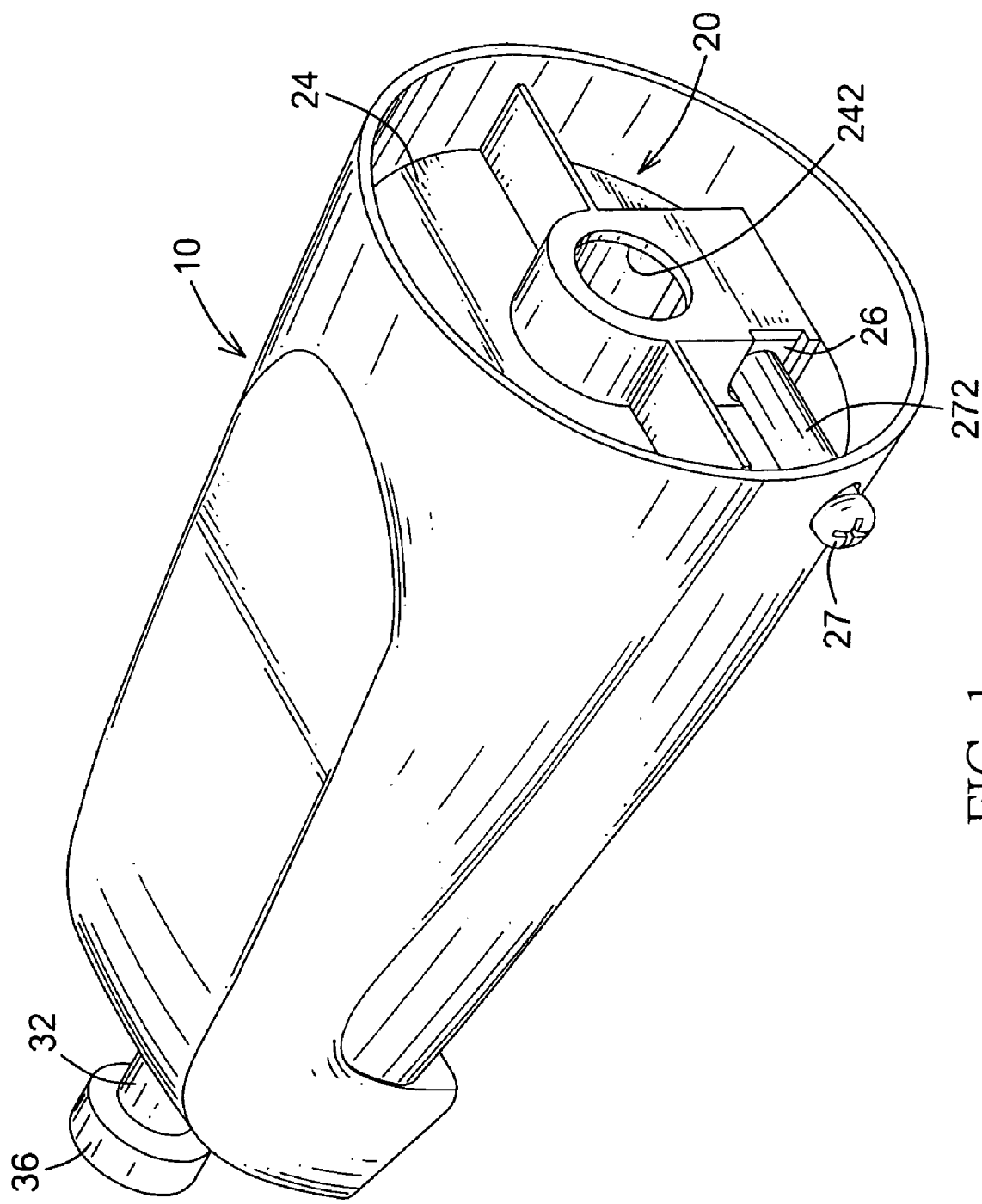
FIG. 1 is a perspective view of a manually operated switch for a faucet in accordance with the present invention.
Figure 2:
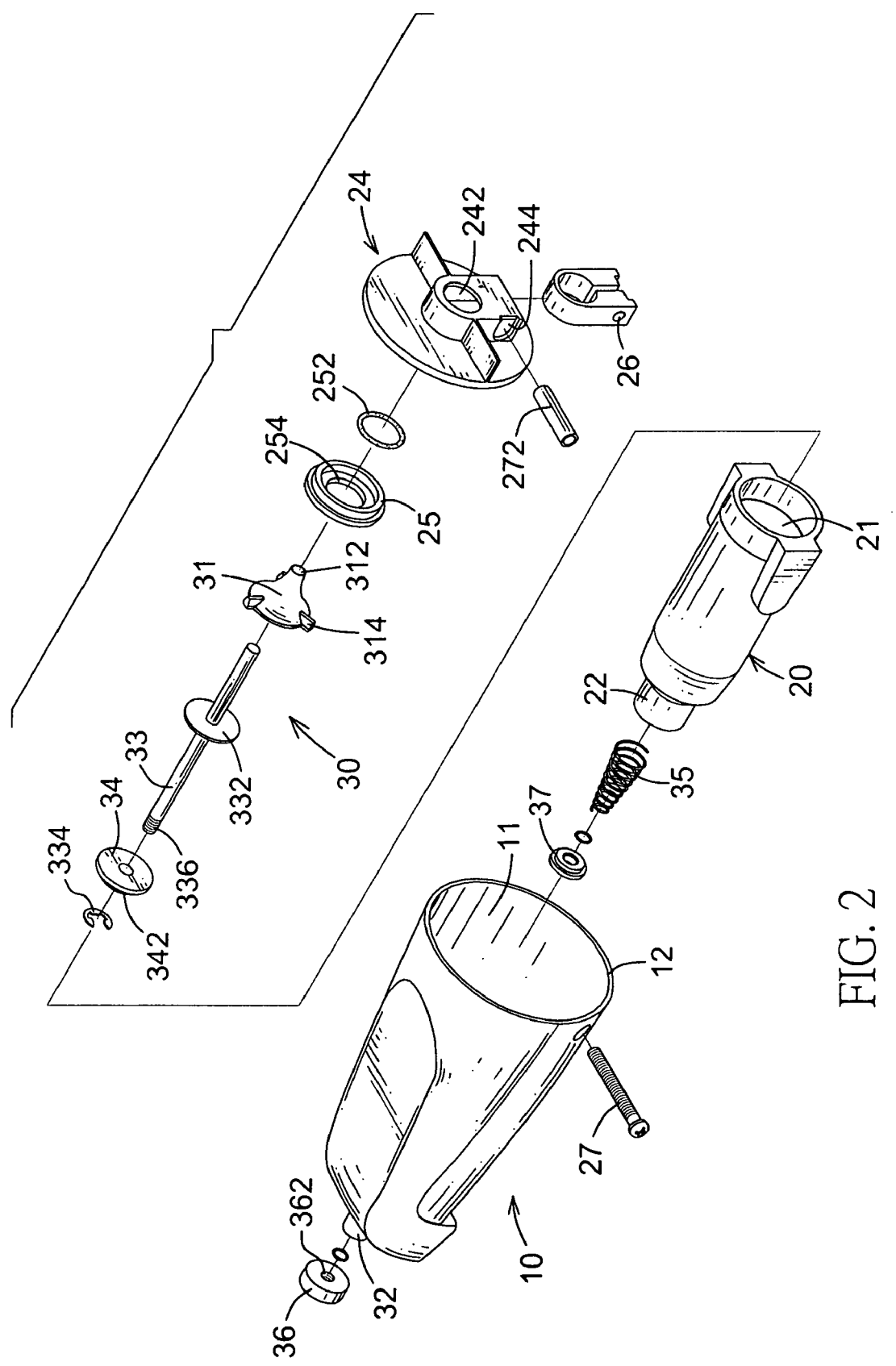
FIG. 2 is an exploded perspective view of the manually operated switch for a faucet in FIG. 1.
Figure 3:
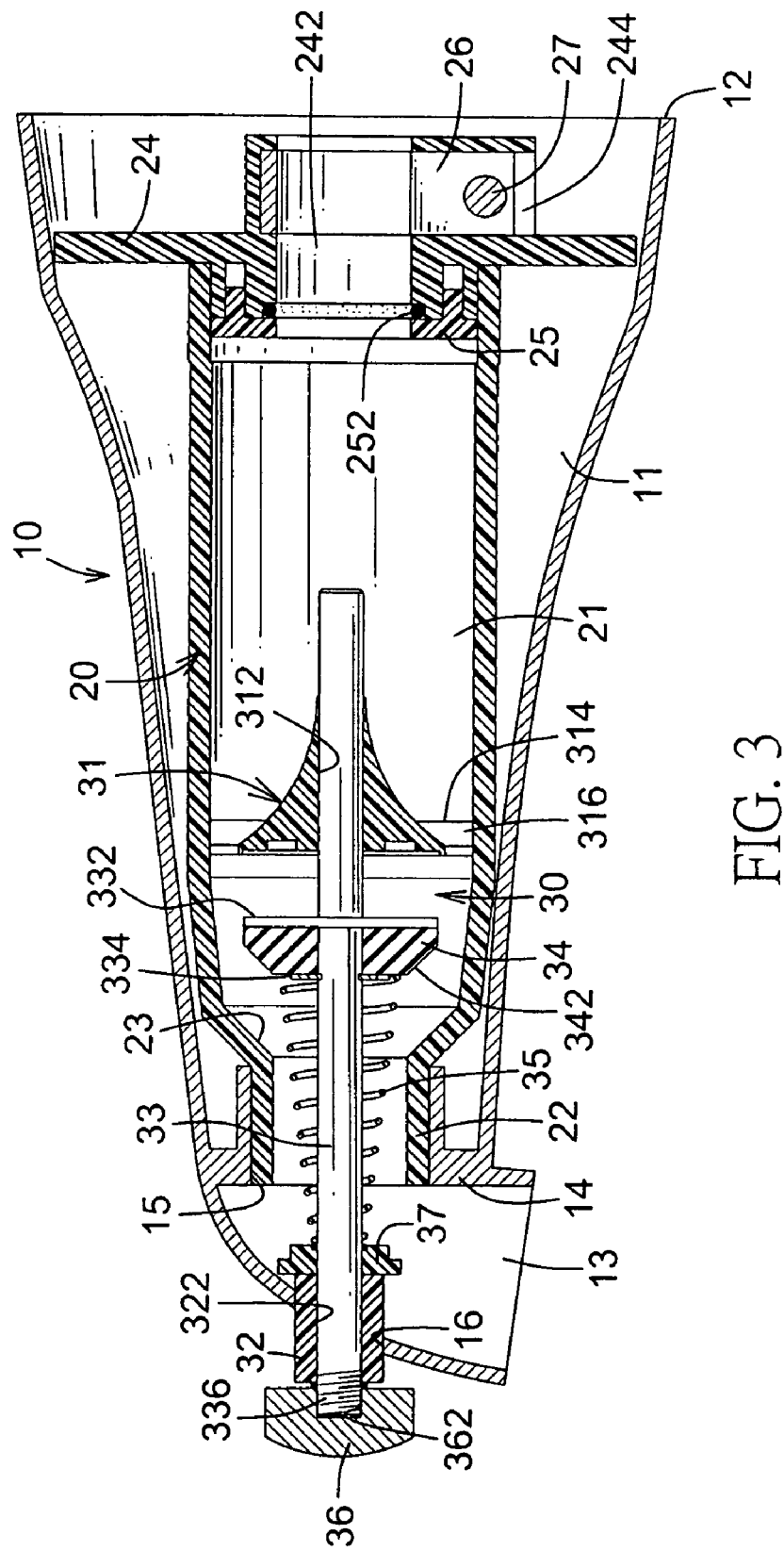
FIG. 3 is a side view in partial section of the manually operated switch for a faucet in FIG. 2.

With reference to FIGS. 1, 2 and 3, a manually operated switch for a faucet connected to a water pipe comprises a body (10), an inner pipe (20), a switching valve assembly (30).

The body (10) is hollow and has a front end, a rear end, a bottom, a bottom opening (13), a seat (14), a hole (16), a rear opening (12) and an optional side hole. The bottom opening (13) is formed at the bottom of the body (10) and near the front end of the body (10). The seat (14) is formed inside of the body (10) and has a through hole (15). The through hole (15) is formed through the seat (14). The hole (16) is formed at the front end of the body (10). The rear opening (12) is formed at the rear end of the body (10). The side hole is formed on the body (10) and near the rear opening (12) of the body (10).

The inner pipe (20) is mounted inside of the body (10) and has a front end, a rear end, a neck (22), a flowing way (21), an optional inner plate (25) and an optional outer plate (24). The neck (22) is formed at the front end of the inner pipe (20) and extends into the through hole (15) of the seat (14) of the body (10). The flowing way (21) is formed through the inner pipe (20) from the neck (22) to the rear end of the inner pipe (20) and has an inner wall and an inner inclined shoulder (23). The inner inclined shoulder (23) is annular and formed on the inner wall of the flowing way (21) and near the front end of the inner pipe (20).

The inner plate (25) is mounted at the rear end of the inner pipe (20) and has a recess, a passing hole (254) and a seal (252). The recess is formed on the inner plate (25) and has a bottom. The passing hole (254) is formed through the bottom of the inner plate (25) and communicates to the flowing way (21) of the body (10). The seal (252) is located at the recess of the inner plate (25). The outer plate (24) is mounted at the rear end of the inner pipe (20) and adjacent to the inner plate (25) to squeeze the seal (252) between the inner plate (25) and the outer plate (24) and has a clamp recess, a pipe hole (242), a bottom hole, a side hole (244), a clamp (26) and a blot (27). The clamp recess is formed on the outer plate (24) and has a bottom. The pipe hole (242) is formed at the bottom of the clamp recess of the outer plate (24) and communicates to the passing hole (254) of the inner plate (25). The side hole (244) is formed in the outer plate (24), corresponds to the side hole of the body (10) and communicates with the clamp recess of the outer plate (24). The bottom hole is formed in the outer plate (24) and communicates with the clamp recess of the outer plate (24).

The clamp (26) is located at the clamp recess of the outer plate (24) through the bottom hole of the outer plate (24) and has a hole, a slit and two screw holes. The hole is formed through the clamp (26) and corresponds to the pipe hole (242) of the outer plate (24). The slit is formed in the clamp (26) and communicates to the hole of the clamp (26). The screw holes are formed at two sides of the slit of the clamp (26) and correspond to each other.

The bolt (27) extends through the side hole of the body (10), a sleeve (272) and the side hole (244) of the outer plate (24) and screws into the screw holes of the clamp (26) to control the tension of the clamp (26) so that the body (10) is able to mount tightly to the water pipe.

The switching valve assembly (30) has a block (34), a frame (31), a rob seat (32), a stopper (37), a spring (35), a button (36) and a rod (33). The block (34) is located inside of the flowing way (21) of the inner pipe (20) and has a through hole and an inclined shoulder (342). The through hole is formed through the block (34). The inclined shoulder (342) is formed on the block (34) and selectively abuts with the inner inclined shoulder (23) of the inner pipe (20).

The frame (31) is located inside of the flowing way (21) of the inner pipe (20) and has a rod hole (312), an outer annular shoulder, multiple fins (314) and multiple passageways (316). The rod hole (312) is formed through the frame (31). The fins (314) are separately formed, extend from the outer annular shoulder of the frame (31) and abut against the inner wall of the inner pipe (20). The passageways (36) are separately formed between the fins (314) and the inner wall of the inner pipe (20).

The rod seat (32) is mounted at the hole (16) of the body (10) and has a sliding hole (322). The sliding hole (322) is formed through the rod seat (32).

The stopper (37) is located inside of the body (10) and between the front end of the body (10) and the neck (22) of the inner pipe (21) and has a hole. The hole is formed through the stopper (37).

The spring (35) is located at neck (22) of the inner pipe (21) and has a front end and a rear end. The front end of the spring (35) is pressed against the stopper (37). The rear end of the spring (35) is pressed against the block (34).

The button (36) has a screw hole (362). The screw hole (362) is formed on the button (36).

The rod (33) has a front end, a rear end, a thread (336), an optional clip (334), and an optional disk (332). The thread (336) is formed at front end of the rod and screws into the screw hole (362) of the button (36) to mount the button (36) onto the rod (33). The rear end of the rod (33) extends through the sliding hole (322) of the rod seat (32), the hole of the stopper (37), the spring (35), the through hole of the block (34) and the rod hole (312) of the frame (31). The disk (332) is formed on and extends out the rod (33). The clip (334) is mounted on the rod (33) to squeeze the block (34) between the clip (334) and the disk (332) of the rod (33).

With further reference to FIG. 3, when the spring (35) pushes the block (34) away the neck (22) of the inner pipe (20), the flowing way (21) of the inner pipe (21) and the bottom opening (13) of the body (10) communicate with each other. The water from the water pipe is able to pass through the flowing way (21) and is exhausted from the bottom opening (13) of the body (10).

Figure 4:
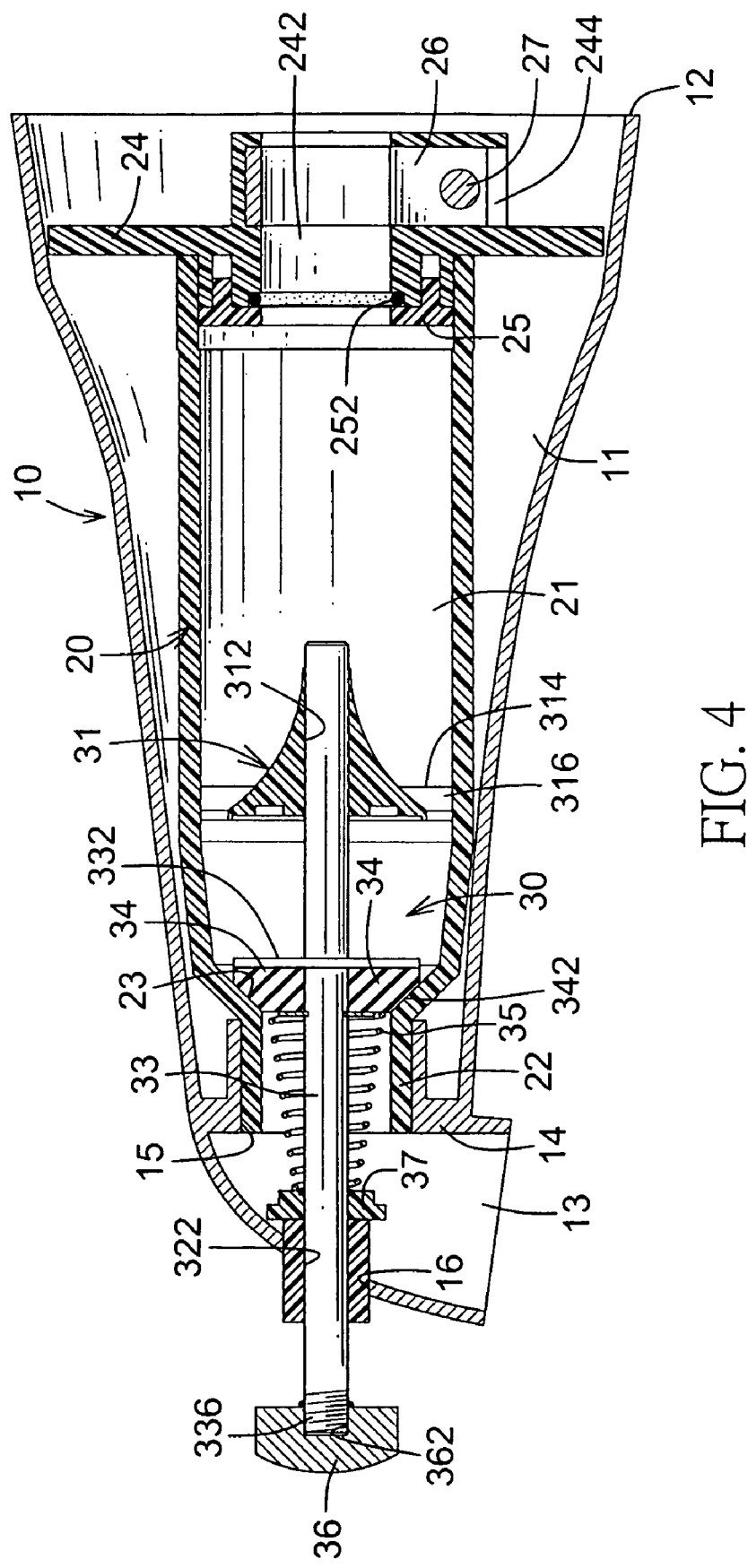
FIG. 4 is an operational side view in partial section of the manually operated switch for a faucet in FIG. 2 when a rod is pulled out of a body.
Figure 5:
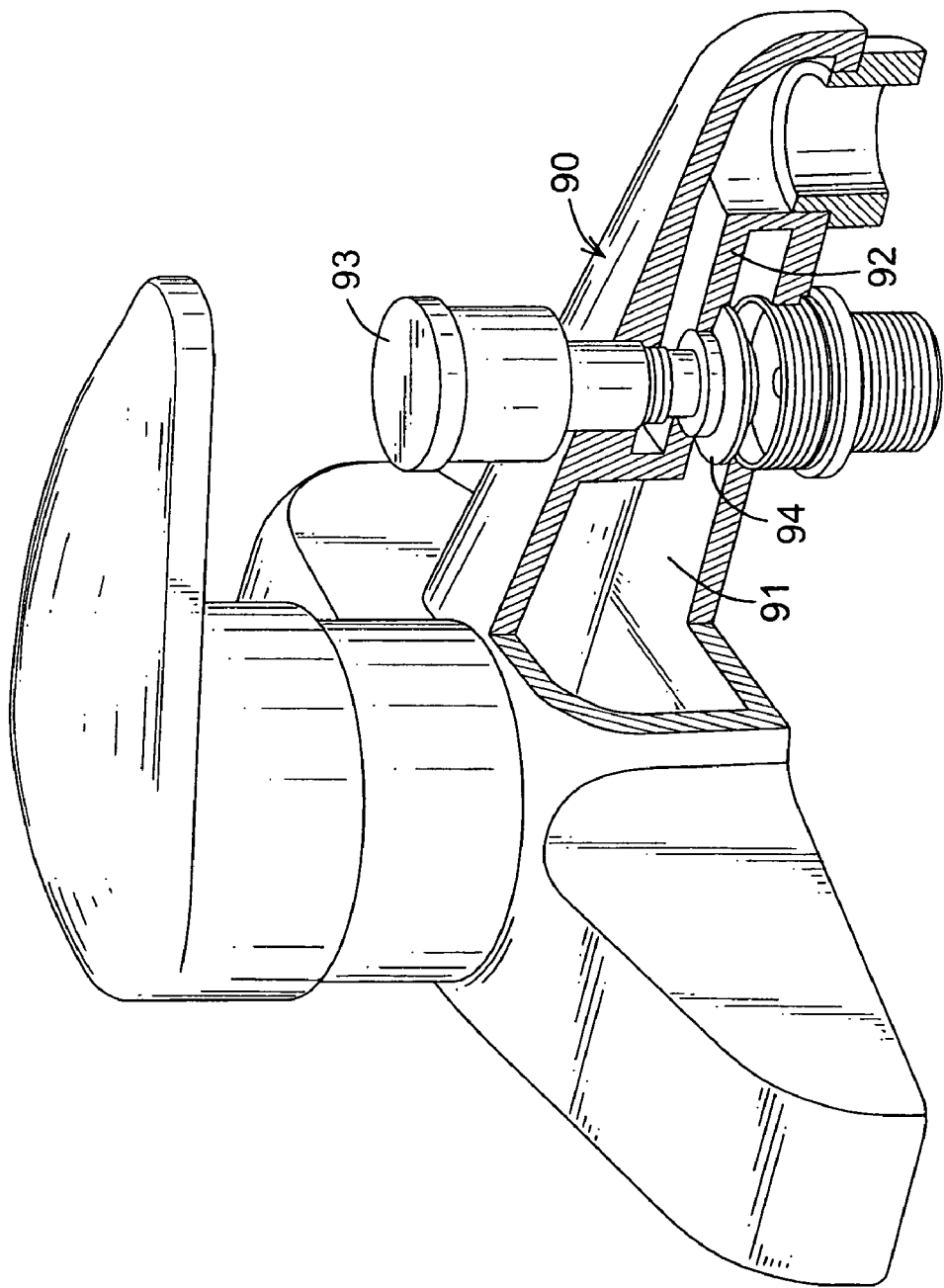
FIG. 5 is a perspective view in partial section of a conventional faucet in accordance with the prior art.

With further reference to FIG. 4, when the rod (33) of the switching valve assembly (30) is pulled, the inclined shoulder (342) of the block (34) abuts with the inner inclined shoulder (23) of the inner pipe (20) to close the flowing way (21) of the inner pipe (21). The water from the water pipe will compress the block (34) with water pressure so that the flowing way (21) of the inner pipe (21) keeps closed. The water from the water pipe may be sprayed from a shower head. When the water pressure applied to the block (34) is dismissed or released, the spring (35) pushes the block (34) away from the neck (22) of the inner pipe (20) and the flowing way (21) of the inner pipe (21) is reopened.

The switching valve assembly (30) and the water pressure are able to control the flowing way (21) of the inner pipe (21) to stay opened or closed. Furthermore, the flowing way (21) of the inner pipe (21) is forced to opened so that the water from the water pipe always is exhausted from the bottom opening (13) of the body (10). The switching valve assembly (30) can make sure the water from the water pipe always to be exhausted from the bottom opening (13) of the body (10) if the flowing way (21) of the inner pipe (21) to stay opened so that an user may not be scared or burned by the water sprayed out from the shower head.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A manually operated switch for a faucet comprising
a body being hollow and having
a front end;
a rear end;
a bottom;
a bottom opening formed at the bottom of the body and near the front end of the body;
a seat formed inside of the body and having
a through hole formed through the seat;
a hole formed at the front end of the body; and
a rear opening formed at the rear end of the body;
an inner pipe mounted inside of the body and having
a front end;
a rear end;

a neck formed at the front end of the inner pipe and extending into the through hole of the seat of the body; and a flowing way formed through the inner pipe from the neck to the rear end of the inner pipe and having an inner wall; and an inner inclined shoulder being annular and formed on the inner wall of the flowing way and near the front end of the inner pipe;

a switching valve assembly having a block located inside of the flowing way of the inner pipe and having a through hole formed through the block; and an inclined shoulder formed on the block and selectively abutting with the inner inclined shoulder of the inner pipe;

a frame located inside of the flowing way of the inner pipe and having a rod hole formed through the frame;

an outer annular shoulder; and multiple fins separately formed and extending out of outer annular shoulder of the frame and abutting against the inner wall of the inner pipe to define multiple passageways between the fins and the inner wall of the inner pipe;

a rod seat mounted at the hole of the body and having a sliding hole formed through the rod seat;

a stopper located inside of the body and between the front end of the body and the neck of the inner pipe and having a hole formed through the stopper;

a spring located at neck of the inner pipe and having a front end pressed against the stopper; and a rear end pressed against the block;

a button having a screw hole formed on the button; and a rod having a front end;

a rear end extending through the sliding hole of the rod seat, the hole of the stopper, the spring, the through hole of the block and the rod hole of the frame; and a thread formed at front end of the rod and screwing into the screw hole of the button to mount the button onto the rod.

2. The faucet as claimed in claim 1, wherein the inner pipe has an inner plate mounted at the rear end of the inner pipe and having a passing hole formed through the bottom of the inner plate and communicating to the flowing way of the body.

3. The faucet as claimed in claim 2, wherein the outer plate has a clamp recess with a bottom and a clamp located at the clamp recess of the outer plate.

4. The faucet as claimed in claim 3, wherein the inner pipe has an outer plate mounted at the rear end of the inner pipe and having a pipe hole formed at the bottom of the clamp recess of the outer plate and communicating with the passing hole of the inner plate;

the inner plate has a recess formed on and a seal squeezed between the recess of the inner plate and the outer plate.

5. The faucet as claimed in claim 4, wherein the rod has a disk formed on and extending out the rod; and a clip mounted on the rod to squeeze the block between the clip and the disk of the rod.

6. The faucet as claimed in claim 5, wherein the body has a side hole formed on the body and near the rear opening of the body;

the clamp has a slit formed on the clamp and communicating with the hole of the clamp and two screw holes formed at the slit of the clamp and corresponding to each other;

the outer plate has a side hole formed on the outer plate, corresponding to the side hole of the body and communicating with the clamp recess of the outer plate; and a blot extending through the side hole of the body and the side hole of the outer plate and screwing into the screw holes of the clamp.

* * * * *